United States Patent
Sun et al.

(10) Patent No.: US 10,841,957 B2
(45) Date of Patent: Nov. 17, 2020

(54) FACILITATING MULTI-NODE LISTEN BEFORE TALK FUNCTIONALITY VIA A CENTRALIZED CONTROLLER

(71) Applicant: QUALCOMM Incorporated, San Diego, CA (US)

(72) Inventors: Jing Sun, San Diego, CA (US); Kapil Bhattad, Bangalore (IN); Aleksandar Damnjanovic, Del Mar, CA (US); Tamer Kadous, San Diego, CA (US); Taesang Yoo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/526,682

(22) Filed: Jul. 30, 2019

(65) Prior Publication Data

US 2020/0045744 A1 Feb. 6, 2020

Related U.S. Application Data

(60) Provisional application No. 62/714,576, filed on Aug. 3, 2018.

(51) Int. Cl.
*H04W 16/14* (2009.01)
*H04W 74/08* (2009.01)
(Continued)

(52) U.S. Cl.
CPC ... *H04W 74/0833* (2013.01); *H04W 72/1257* (2013.01); *H04W 88/12* (2013.01); *H04L 5/0007* (2013.01)

(58) Field of Classification Search
None
See application file for complete search history.

(56) References Cited

U.S. PATENT DOCUMENTS

2018/0027580 A1  1/2018  Yoo et al.
2019/0109682 A1* 4/2019  Ahn ............... H04L 5/0035

FOREIGN PATENT DOCUMENTS

WO   WO-2017171369 A2   10/2017

OTHER PUBLICATIONS

Intel Corporation: "Support of Dynamic Point Switching CoMP for LAA Systems", 3GPP TSG RAN WG1 Meeting #82bis, 3GPP Draft; R1-155314 Support of Dynamic Point Switching Comp for LTE-LAA in TM10, 3rd Generation Partnership Project (3GPP), Mobile Competence Centre; 650, Route Des Lucioles; F-96921 Sophia-Antipolis, vol. RAN WG1, No. Malmo, Sweden; Oct. 5, 2015-Oct. 9, 2015, Oct. 4, 2015 (Oct. 4, 2015), pp. 1-2, XP051002252, Retrieved from the Internet: URL: http://www.3gpp.org/ftp/Meetings_3GPP_SYNC/RAN1/Docs/ [retrieved on Oct. 4, 2015] p. 1; figure 1.

(Continued)

Primary Examiner — Ayanah S George
(74) Attorney, Agent, or Firm — Loza & Loza, LLP/Qualcomm

(57) ABSTRACT

Aspects directed towards facilitating multi-node listen before talk (LBT) functionality via a centralized controller are disclosed. In one example, for each of a plurality of scheduled entities, a corresponding set of scheduling entities is identified, and each scheduling entity of the set of scheduling entities is instructed to perform at least one LBT evaluation. This example then further includes controlling whether any of the plurality of scheduled entities is served by a corresponding one or more scheduling entities of the set of scheduling entities based on the at least one LBT evaluation performed by each scheduling entity.

30 Claims, 10 Drawing Sheets

(51) Int. Cl.
*H04W 88/12* (2009.01)
*H04W 72/12* (2009.01)
*H04L 5/00* (2006.01)

(56) References Cited

OTHER PUBLICATIONS

International Search Report and Written Opinion—PCT/US2019/044340—ISA/EPO—dated Oct. 17, 2019.

* cited by examiner

FACILITATING MULTI-NODE LISTEN BEFORE TALK FUNCTIONALITY VIA A CENTRALIZED CONTROLLER

CROSS-REFERENCE TO RELATED APPLICATION(S)

This application claims priority to and the benefit of U.S. Provisional Patent Application No. 62/714,576, filed on Aug. 3, 2018, the entire content of which is incorporated herein by reference as if fully set forth below in its entirety and for all applicable purposes.

TECHNICAL FIELD

The technology discussed below relates generally to wireless communication systems, and more particularly, to facilitating multi-node listen before talk (LBT) functionality via a centralized controller.

INTRODUCTION

As the demand for mobile broadband access continues to increase, research and development continue to advance wireless communication technologies not only to meet the growing demand for mobile broadband access, but to advance and enhance the user experience with mobile communications. The development of 5G New Radio (NR), for example, emerged from the desire to offer next-generation mobile services that meet strict latency, throughput, and reliability performance targets.

As with any mobile wireless system, spectrum is critical to 5G NR. To this end, it is anticipated that 5G NR will operate across a very diverse spectrum, which includes low-band, mid-band, and high-band (mmWave) frequencies. Licensed exclusive use spectrum is generally preferred by mobile operators because it provides greater certainty of performance and reduced risk of interference. Shared spectrum in 5G NR, however, provides new opportunities, both as a complement to exclusive-use licensed spectrum and as a way for non-operator organizations to deploy private networks (e.g., in public venues workplaces, etc.). With an increasing number of operators competing for shared resources though, determining which operator should be granted those resources can be challenging. Accordingly, designing a fair mechanism for assigning shared resources amongst multiple operators is particularly desirable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards facilitating multi-node listen before talk (LBT) functionality via a centralized controller are disclosed. In one example, a method is disclosed, which includes identifying, for each of a plurality of scheduled entities, a corresponding set of scheduling entities, and instructing each scheduling entity of the set of scheduling entities to perform at least one LBT evaluation. The method further includes controlling whether any of the plurality of scheduled entities is served by a corresponding one or more scheduling entities of the set of scheduling entities based on the at least one LBT evaluation performed by each scheduling entity.

In another aspect, a centralized controller in a wireless communication network is disclosed. The centralized controller can include a network interface communicatively coupled to a plurality of scheduling entities in the wireless communication network, a memory, and a processor communicatively coupled to the network interface and the memory. For this example, the processor may be configured to perform various acts. For instance, the processor can be configured to identify, for each of a plurality of scheduled entities, a corresponding set of scheduling entities, and further configured to instruct each scheduling entity of the set of scheduling entities to perform at least one LBT evaluation. The processor can also be further configured to control whether any of the plurality of scheduled entities is served by a corresponding one or more scheduling entities of the set of scheduling entities based on the at least one LBT evaluation performed by each scheduling entity.

In a further aspect, an apparatus in a wireless communication network is disclosed. The apparatus can include each of a means for identifying, a means for instructing, and a means for controlling. For this example, the means for identifying can be configured to identify, for each of a plurality of scheduled entities, a corresponding set of scheduling entities, whereas the means for instructing can be configured to instruct each scheduling entity of the set of scheduling entities to perform at least one LBT evaluation. The means for controlling can be configured to control whether any of the plurality of scheduled entities is served by a corresponding one or more scheduling entities of the set of scheduling entities based on the at least one LBT evaluation performed by each scheduling entity.

In yet another aspect, an article of manufacture for use by a centralized controller in a wireless communication network. Here, the article of manufacture includes a non-transitory computer-readable medium having stored therein instructions executable by one or more processors of the centralized controller to perform various acts. For instance, the non-transitory computer-readable medium may include instructions executable by the one or more processors of the centralized controller to identify, for each of a plurality of scheduled entities, a corresponding set of scheduling entities, and instruct each scheduling entity of the set of scheduling entities to perform at least one LBT evaluation. The non-transitory computer-readable medium may further include instructions executable by the one or more processors of the centralized controller to control whether any of the plurality of scheduled entities is served by a corresponding one or more scheduling entities of the set of scheduling entities based on the at least one LBT evaluation performed by each scheduling entity.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
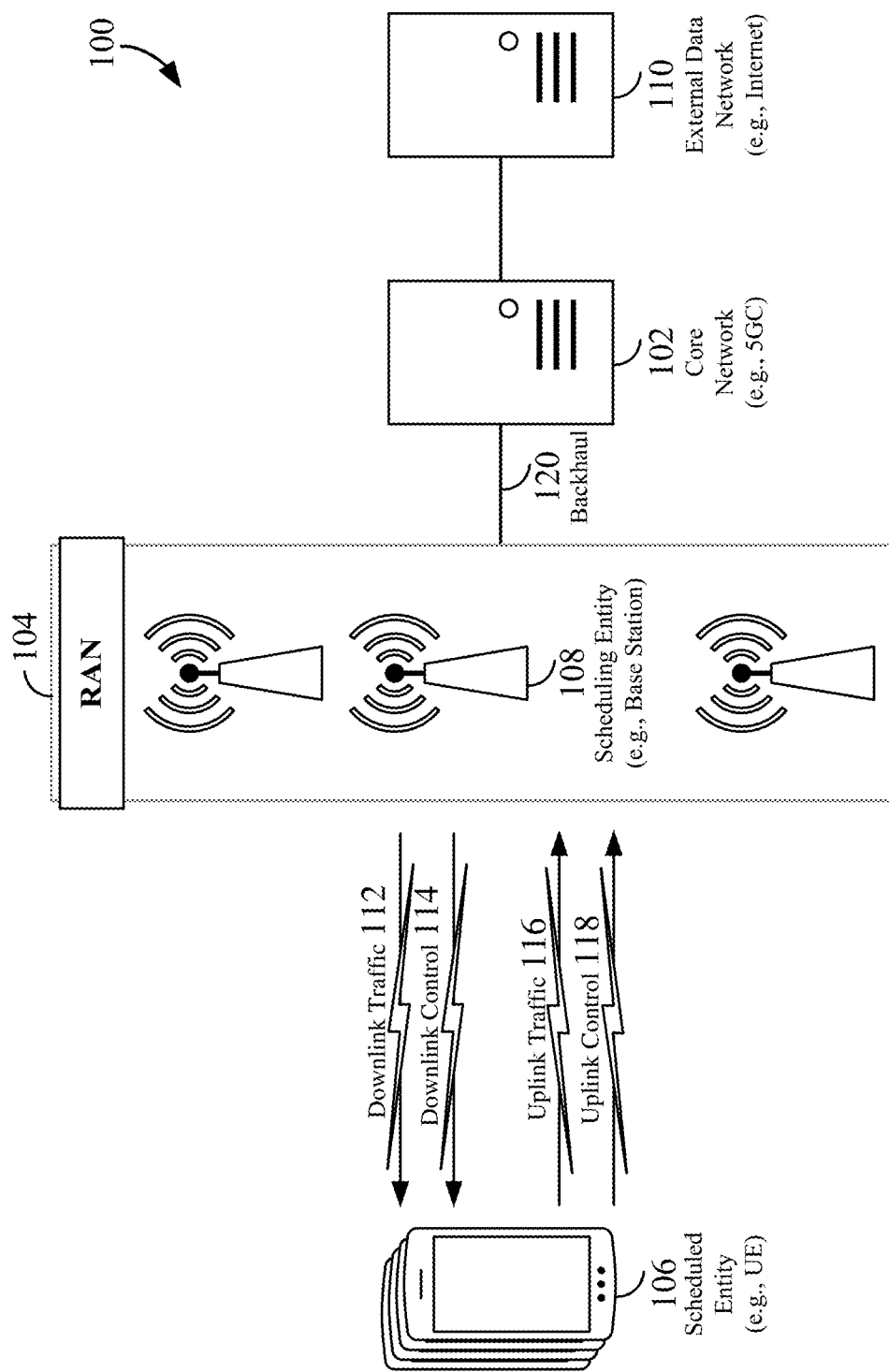
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects disclosed herein are directed towards facilitating multi-node listen before talk (LBT) functionality via a centralized controller. As used herein, it should be appreciated that LBT is defined as a non-scheduled, contention-based multiple access technology where a device monitors or senses a carrier to determine if it is available before transmitting over the carrier. Some LBT technologies utilize signaling, such as a request to send (RTS) and a clear to send (CTS), to reserve the channel for a given duration of time. An LBT protocol makes it possible for multiple operators to share the same channel, which is particularly desirable in the unlicensed band where multiple operators contend for shared resources. It is further noted that, for each operator, it is contemplated that a cluster of gNBs are connected to a centralized controller, wherein the controller has at least a signaling connection to the gNBs, and possibly a data connection, which can yield many different scenarios for serving a user equipment (UE). When determining how a UE will be served, the aspects disclosed herein include the centralized controller facilitating fairness between operators that utilize the same radio access technology (RAT), as well as between operators having different RATs (e.g., NR-U vs WiFi). Aspects disclosed herein also include the centralized controller deciding which subset of gNBs to form a cluster for a transmission, as well as how to select a set of UEs to serve.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
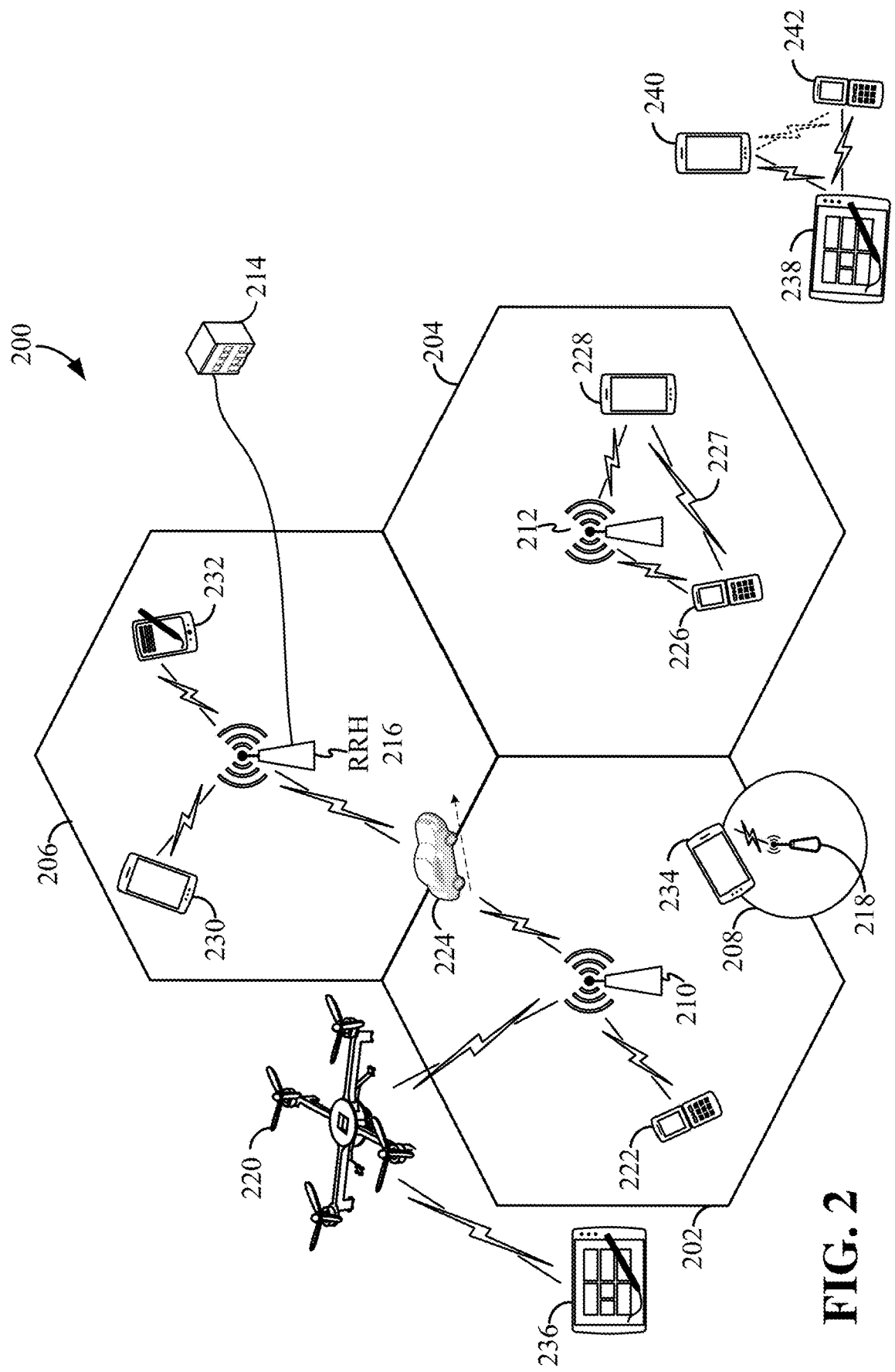
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
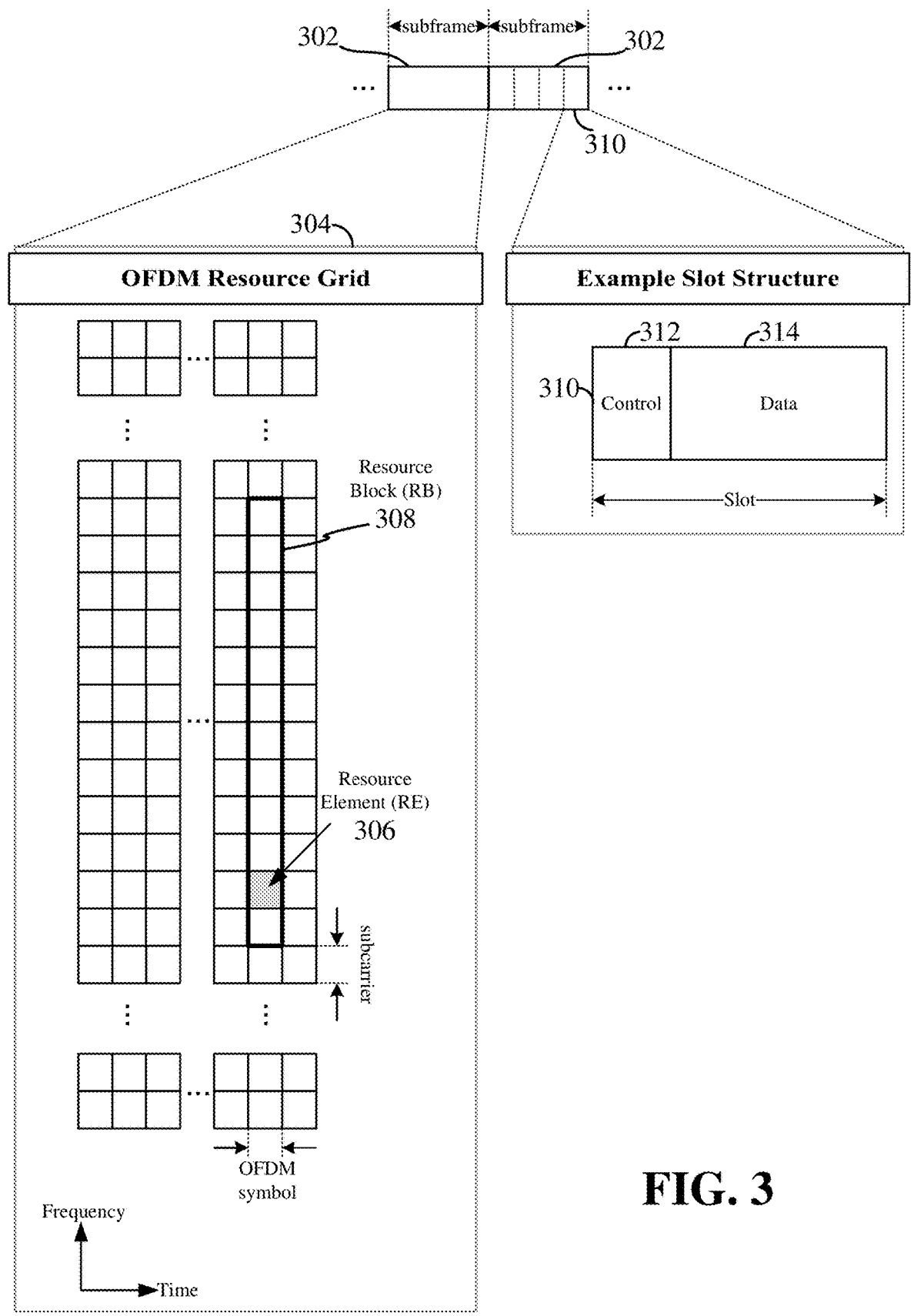
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

As previously stated, various aspects disclosed herein are directed towards facilitating multi-node LBT functionality via a centralized controller. Here, it should be appreciated that LBT may utilize a back-off procedure in which a device having traffic to send generates a random back-off time after detecting the unlicensed channel is idle, and then decrements a back-off timer initialized with the random back-off time until the unlicensed channel becomes busy or the timer reaches zero. If the unlicensed channel becomes busy prior to expiration of the back-off timer, the device may freeze the timer. When the back-off timer expires (or decrements to zero), the device may transmit the traffic.

Figure 4:
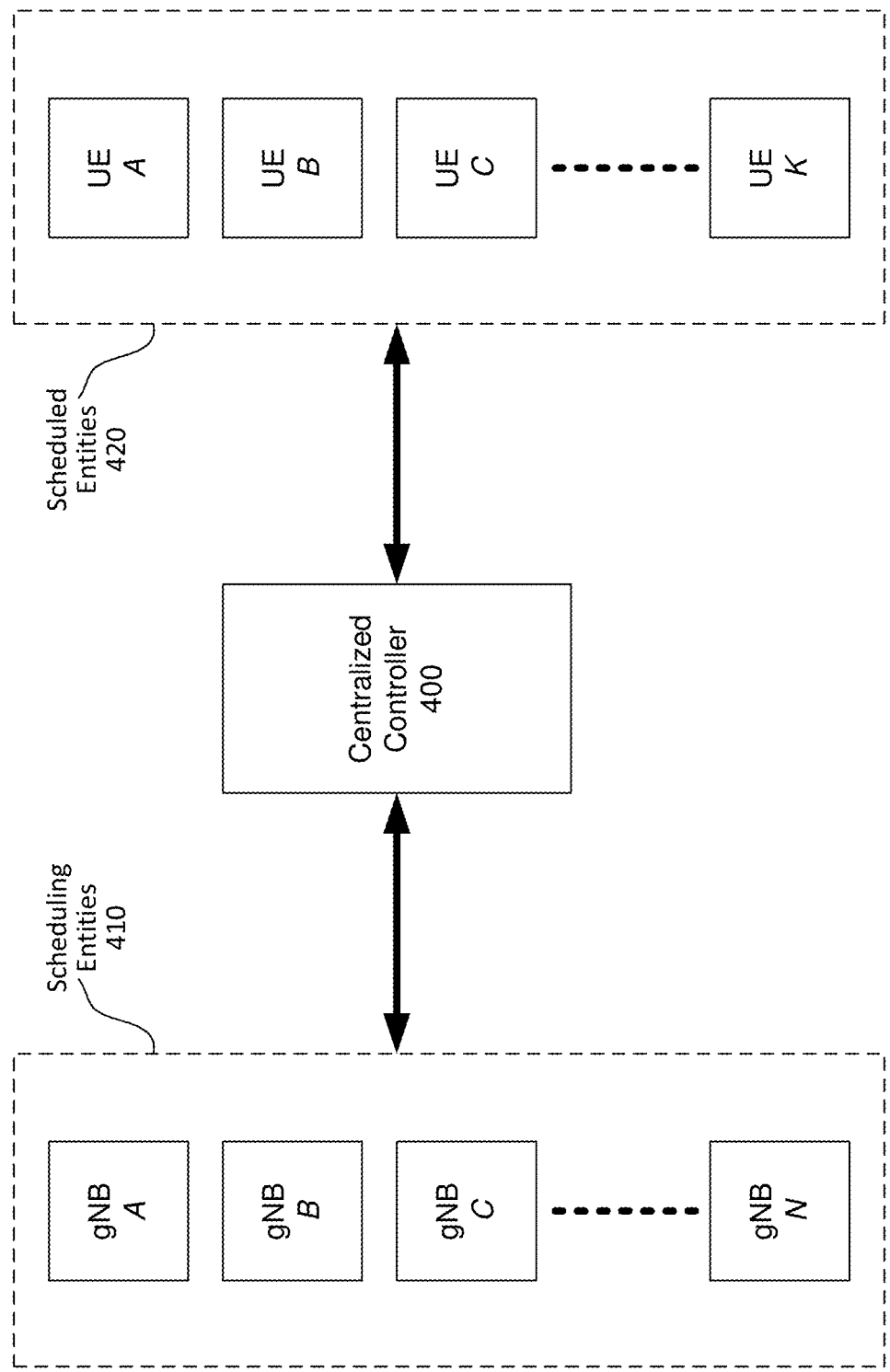
FIG. 4 is an illustration of an exemplary centralized controller coupled to scheduling entities and scheduled entities in accordance with aspects disclosed herein.

In FIG. 4, an illustration of an exemplary centralized controller coupled to scheduling entities and scheduled entities is provided in accordance with aspects disclosed herein. In a particular aspect of the disclosure, it is contemplated that the centralized controller 400 controls the LBT configuration of the scheduling entities 410. For example, such configuration may include configuring the different gNBs to perform LBTs at the same time (for example starting an extended clear channel assessment (eCCA) at the same time and with the same random number for a counter).

As another example the centralized controller 400 may ask different gNBs to perform LBT evaluations such that their respective end times are coordinated. For instance, counters may be used, wherein gNBs employing a random backoff based LBT procedure that reach a counter of zero prior to the coordinated end time continue to decrement the counter until the start point. If a gNB detects interference when the counter is zero or negative, the gNB may either declare that the LBT failed or restart with a new random backoff. At the coordinated end time, all gNBs with zero or negative counters are allowed to transmit.

It should be noted that an LBT procedure that utilizes a random backoff and countdown procedure is generally referred to as a Category 4 LBT (Cat 4 LBT) procedure. Some gNBs may be requested to perform Cat 4 LBT while some others may be asked to perform a Category 2 LBT (Cat 2 LBT) where the gNB measures the channels for a fixed duration (such as 25 us) before the transmission. The centralized controller 400 may also ask some gNBs to perform both Cat 4 and Cat 2 LBT procedure in parallel.

In another aspect of the disclosure, the centralized controller 400 is coupled to a plurality of scheduled entities 420 (e.g., a plurality of UEs, as illustrated), wherein the centralized controller 400 may be configured to maintain an active set of gNBs and a candidate set of gNBs for each UE. For this particular implementation, the active set gNBs are deemed to be the scheduling entities 410 that can independently serve a UE, whereas the candidate set gNBs are deemed to be the scheduling entities 410 that can assist the active set gNBs to serve the UE.

As one example, a UE may only be allowed to be served if its closest gNB is transmitting. When this UE is being served, other neighboring gNBs can also assist this UE by, for example, sending the same data such as the signals from its main serving gNB (closest gNB) and neighboring gNBs so that the signals are constructively added at the UE (CoMP transmissions). Although the UE could have been served data even if only the neighboring gNB transmits, having the constraint that the UE only be served if the closest gNB transmits may make the system more efficient. This also avoids scenarios where only a very weak gNB transmits to a UE thereby creating interference and negatively impacting the network throughput and offsetting any benefit its provides to the UE. In such cases, the closest gNB may be added to the active gNB set of the UE and neighboring gNBs may be added in the candidate set of the UE. It should also be noted that assistance can take many forms including, for example, where multiple gNBs may send the same data using joint precoding across gNBs, and where different gNBs may send different pieces of data as different MIMO streams etc.

Various other aspects are also disclosed herein. For instance, in another exemplary implementation, it is contemplated that a gNB serving cluster (i.e., gNBs in an active set or candidate set) will depend on the LBT outcome of each gNB (i.e., whether the gNB concludes that a channel is clear based on an initial clear channel assessment (iCCA) and an extended clear channel assessment (eCCA)), and that the selection of which UEs to serve will also depend on the gNB LBT outcome. For instance, an exemplary serving rule may include requiring that an active set gNB pass a Category 4 LBT (Cat 4 LBT) to be eligible to serve a UE (i.e., requiring that an active set gNB conclude that a channel is clear). The serving rule may then further include requiring that a candidate set gNB only needs to pass a Category 2

LBT (Cat 2 LBT) to assist another active set gNB (which passed Cat 4 LBT) to serve the UE.

It is contemplated that the centralized controller 400 disclosed herein can be implemented within the context of either a coordinated multi-point (CoMP) scenario or a non-CoMP scenario. Here, it should be appreciated that, in a CoMP network configuration, transmissions from multiple transmission points (TRPs) may be simultaneously directed towards a UE. In a multi-TRP transmission scheme, multiple TRPs may be co-located and may or may not be within a same cell. Each of the multiple TRPs (e.g., gNBs) may transmit the same or different data to a UE. When transmitting different data from the multiple TRPs, a higher throughput may be achieved. When transmitting the same data (with potentially different redundancy versions) from the multiple TRPs, transmission reliability may be improved. In some examples, each TRP may utilize the same carrier frequency to communicate with a UE. In other examples, each TRP may utilize a different carrier frequency (referred to as a component carrier) and carrier aggregation may be performed at the UE.

In the non-CoMP scenario, the centralized controller 400 may control the gNB LBT behavior and the data to be delivered by each gNB. Here, because gNBs are not coordinated, it is noted that gNBs cannot jointly serve a UE in the non-CoMP scenario. For the non-CoMP scenario (e.g., a non-multi-TRP case), it is assumed that an active set size is exactly one (i.e., a UE can be served by only one gNB), and that the candidate set is always empty. For this case, since there is no candidate set gNB, only a coordinated Cat 4 LBT is needed. The coordinated Cat 4 LBT in this scenario allows different gNBs to transmit to their UEs at the same time without blocking each other. Without coordination, as gNBs may have different start times, if a gNB starts transmission during the gNBs transmission burst, the LBT of neighboring gNBs would fail and thus the neighboring gNBs would be prevented from transmitting.

In the CoMP scenario (e.g., multi-TRP case), however, different configurations are considered. For instance, in a master-slave based multi-TRP design where, among the TRPs to serve the UE, one is the master (i.e., sending control and data) and the others are slaves (i.e., sending data only)), a master TRP is deemed an active set member, whereas a slave TRP is a candidate set member. However, for multi-master multi-TRP design in which each serving TRP can work independently, it is assumed that an active set size can be larger than 1 (i.e., a UE can be served by more than one gNB) and that the candidate set is empty. It should also be noted that some gNBs may be in both the active and candidate set of a UE.

In a particular aspect of the disclosure, it is contemplated that the centralized controller 400 may be configured to enforce a set of LBT rules for the non-CoMP scenario. For instance, a first LBT rule may include having the centralized controller 400 determine a set of scheduled entities (e.g., UEs) from amongst the scheduled entities 420 potentially to be served. Such information may be obtained from a respective buffer status of each UE, wherein a subset of UEs, each with a non-empty buffer, are to be served (e.g., depending on a scheduler decision).

A second contemplated LBT rule for the non-CoMP scenario includes having the centralized controller 400 configure the active set gNBs to perform a Cat 4 LBT. For instance, the centralized controller 400 may be configured to align Cat 4 LBTs so that the ending time is the same. The centralized controller 400 may also be configured to adapt the ending time dynamically based, for example, on how the Cat 4 LBT is progressing along different nodes—for example if no node is likely to pass Cat 4 LBT at a specified ending time, it moves the ending time to a later time.

A third contemplated LBT rule for the non-CoMP scenario includes having the centralized controller 400 configure the candidate set gNBs to perform a Cat 2 LBT, if the candidate sets are not empty. For instance, the centralized controller 400 may be configured to align a start time for these Cat 2 LBTs with the ending time of the active set Cat 4 LBTs.

A fourth contemplated LBT rule for the non-CoMP scenario includes having the centralized controller 400 configured to determine which scheduled entities 420 may be served by which scheduling entities 410. For instance, such rule may indicate that, for the active set members of scheduling entities 410 that passed the Cat 4 LBT, the corresponding UEs of scheduled entities 420 can be served (can also down select). Here, it should be noted that the result is the final serving active set gNB and the final served UE set.

A fifth contemplated LBT rule for the non-CoMP scenario includes having the centralized controller 400 configured to determine, for the final served UE set, if any of the candidate set gNBs for each of the UEs in the final served UE set passed the cat 2 LBT. If so, under this rule, those candidate gNBs can serve the corresponding UE as well in an assisting fashion. Here, the set of transmitting candidate set gNBs and the active set gNBs form a serving cluster for a transmission to the corresponding UE.

A sixth contemplated LBT rule for the non-CoMP scenario includes having the centralized controller 400 configured to allow for one gNB to be an active set gNB of one UE and a candidate set gNB for another UE.

A seventh contemplated LBT rule for the non-CoMP scenario includes having a gNB still serve a UE as a candidate set gNB, if the gNB fails the Cat 4 LBT but passes the Cat 2 LBT.

Figure 5:
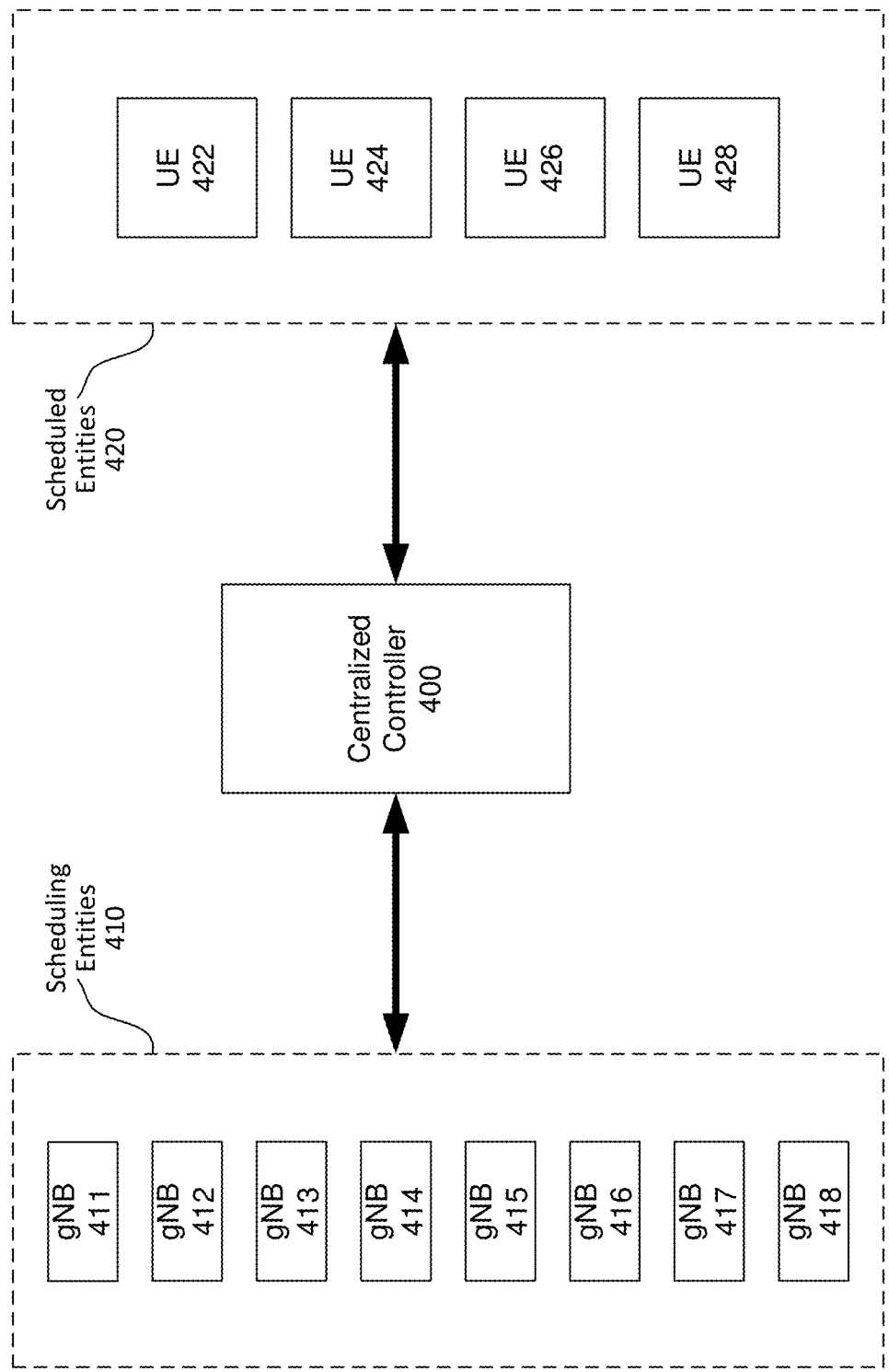
FIG. 5 is an illustration of the exemplary centralized controller illustrated in FIG. 4 within the context of a particular configuration of scheduling entities and scheduled entities in accordance with aspects disclosed herein.

Referring next to FIG. 5, an illustration of the exemplary centralized controller 400 illustrated in FIG. 4 is provided within the context of a particular configuration of scheduling entities 410 and scheduled entities 420 in accordance with aspects disclosed herein. For this configuration, it is assumed that scheduling entities 410 includes gNBs 411, 412, 413, 414, 415, 416, 417, and 418, whereas scheduled entities 420 includes UEs 422, 424, 426, and 428.

Figure 6:
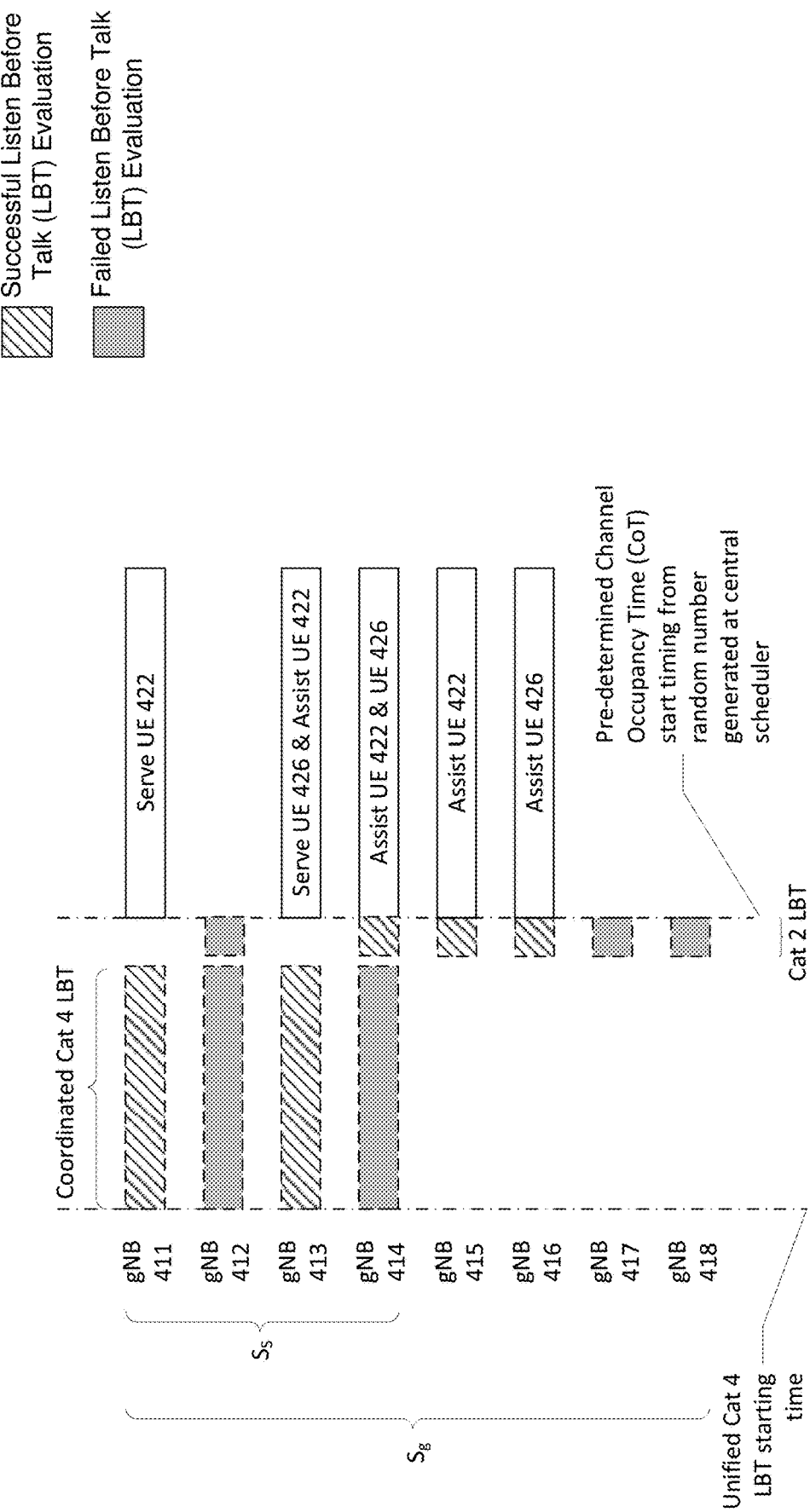
FIG. 6 illustrates a first set of exemplary listen before talk (LBT) evaluations performed within the context of the particular configuration illustrated in FIG. 5 in accordance with aspects disclosed herein.

Referring next to FIG. 6 a first set of exemplary LBT evaluations performed within the context of the configuration illustrated in FIG. 5 is provided in accordance with aspects disclosed herein. Here, a non-CoMP multi-TRP scenario is assumed in which there is a single master, although a multiple master case is substantially similar In this example, it is further assumed that the active/candidate set associations between the UEs 422, 424, 426, and 428 and the gNBs 411, 412, 413, 414, 415, 416, 417, and 418 are as follows:

| UE | Active Set | Candidate Set |
|---|---|---|
| UE 422 | gNB 411 | gNB 412, gNB 413, gNB 414, and gNB 415 |
| UE 424 | gNB 412 | gNB 411, gNB 413, gNB 415, and gNB 416 |
| UE 426 | gNB 413 | gNB 412, gNB 414, gNB 416, and gNB 418 |
| UE 428 | gNB 414 | gNB 413, gNB 417, and gNB 418 |

In this example, the centralized controller 400 may be configured to begin by identifying the union of all active set gNBs (i.e., gNB 411, 412, 413, and 414), and instructing each of these gNBs perform a Cat 4 LBT. The centralized controller 400 then identifies a subset of these gNBs based on whether they passed the Cat 4 LBT. As illustrated, for this example, it is assumed that gNB 411 and gNB 413 passed the Cat 4 LBT, whereas gNB 412 and gNB 414 failed the Cat 4 LBT. Therefore, since it is contemplated that only UEs with an active set gNB that passes a Cat 4 LBT can be served, only UE 422 and UE 426 can be served, wherein UE 422 is served by gNB 411, and wherein UE 426 is served by gNB 413, as shown.

The centralized controller 400 may also be configured to instruct any active set gNB that fails the Cat 4 LBT to nevertheless perform a Cat 2 LBT. Accordingly, in this example, each of gNB 412 and gNB 414 are instructed to perform a Cat 2 LBT, wherein gNB 412 is shown as failing the Cat 2 LBT, and gNB 414 is shown as passing the Cat 2 LBT.

In addition, the centralized controller 400 is configured to identify the union of all candidate set gNBs (i.e., gNB 415, 416, 417, and 418), and to instruct each of these gNBs perform a Cat 2 LBT. The centralized controller 400 then identifies a subset of these candidate gNBs based on whether they passed the Cat 2 LBT. As illustrated, for this example, it is assumed that gNB 415 and gNB 416 passed the Cat 2 LBT, whereas gNB 417 and gNB 418 failed the Cat 2 LBT.

In order to determine which gNBs can assist to serve a UE, the centralized controller 400 may then compare the UEs that were identified as being served (i.e., UE 422 and UE 426) with corresponding candidate set gNBs of those UEs that passed the Cat 2 LBT. With respect to UE 422, the centralized controller 400 would thus identify each of gNBs 413, 414, and 415 as assisting UE 422, as shown. Similarly, with respect to UE 426, the centralized controller 400 would identify each of gNBs 414 and 416 as assisting UE 426, as shown.

Referring next to the aforementioned CoMP scenario, it is again assumed that the centralized controller 400 controls the gNB LBT behavior. Here, however, the controller sends data to each gNB, and the gNBs are calibrated, which allows multiple gNBs to serve one or more UEs.

In a first exemplary design of the CoMP scenario, various assumptions are made. For instance, in this design, it is again assumed that active set gNBs and candidate set gNBs are allowable, wherein a UE's active set gNB can independently serve the UE. It is further assumed that a UE can select a single gNB (e.g., the closest) as the active set gNB, or more than one gNB (e.g., the next closest gNBs) as the active set gNBs, if allowed. For this design, since candidate set gNBs might not necessarily have good signal strength with the UE, it is also assumed that candidate set gNBs can only assist with transmissions (i.e., they cannot transmit by themselves without an active set gNB). And finally, it is assumed that the active/candidate set gNBs are defined to maintain some fairness so as to avoid having some UEs more likely to be served than others.

With respect to LBT rules for this first CoMP design, it should be noted that the same LBT rules listed for the non-CoMP case can be applied, wherein the only difference might be how the UEs are served. Accordingly, it should be appreciated that the same exemplary LBT evaluations illustrated in FIG. 6 are applicable to this first CoMP design.

A second exemplary CoMP design, however, is also contemplated. For this design, a more aggressive approach is implemented so as to increase the likelihood that a UE will be served. Here, there are only active set gNBs, and no candidate set gNBs. Therefore, compared to the first CoMP design, this active set includes both the active set gNBs and the candidate set gNBs. For this design there is thus no dedicated single active set gNB within all gNBs that a UE receives a signal from.

For this second CoMP design, it is contemplated that the centralized controller 400 may again be configured to enforce a particular set of LBT rules. For instance, a first LBT rule may include having the centralized controller 400 determine a set of UEs from amongst the scheduled entities 420 potentially to be served. Such information may again be obtained from a buffer status, wherein it is possible that a subset of UEs with a non-empty buffer is to be served (e.g., depending on a scheduler decision).

A second contemplated LBT rule for this second CoMP design includes having the centralized controller 400 configure the active set members of the selected UEs to perform a Cat 4 LBT. For instance, the centralized controller 400 may be configured to align Cat 4 LBTs so that the ending time is the same if no interference is measured. Here, it is again possible that a gNB can fail the Cat 4 LBT, yet pass the Cat 2 LBT, wherein the centralized controller 400 is configured to align the Cat 2 LBT with the end of the other Cat 4 LBTs. Based on the LBT outcomes, the centralized controller 400 will then compile a list of gNBs that passed the Cat 4 LBT and a list of gNBs that only passed the Cat 2 LBT.

LBT rules for this second CoMP design are also contemplated for identifying a serving gNB set and a served UE set. In order to make this identification, the centralized controller 400 may be configured to have the UEs associated with at least one gNB that passed a Cat 4 LBT to be served, whereas the UEs only associated with gNBs that passed a Cat 2 LBT cannot be served. The gNBs that passed a Cat 2 LBT, however, can assist other gNBs that passed a Cat 4 LBT and are thus serving a UE.

Figure 7:
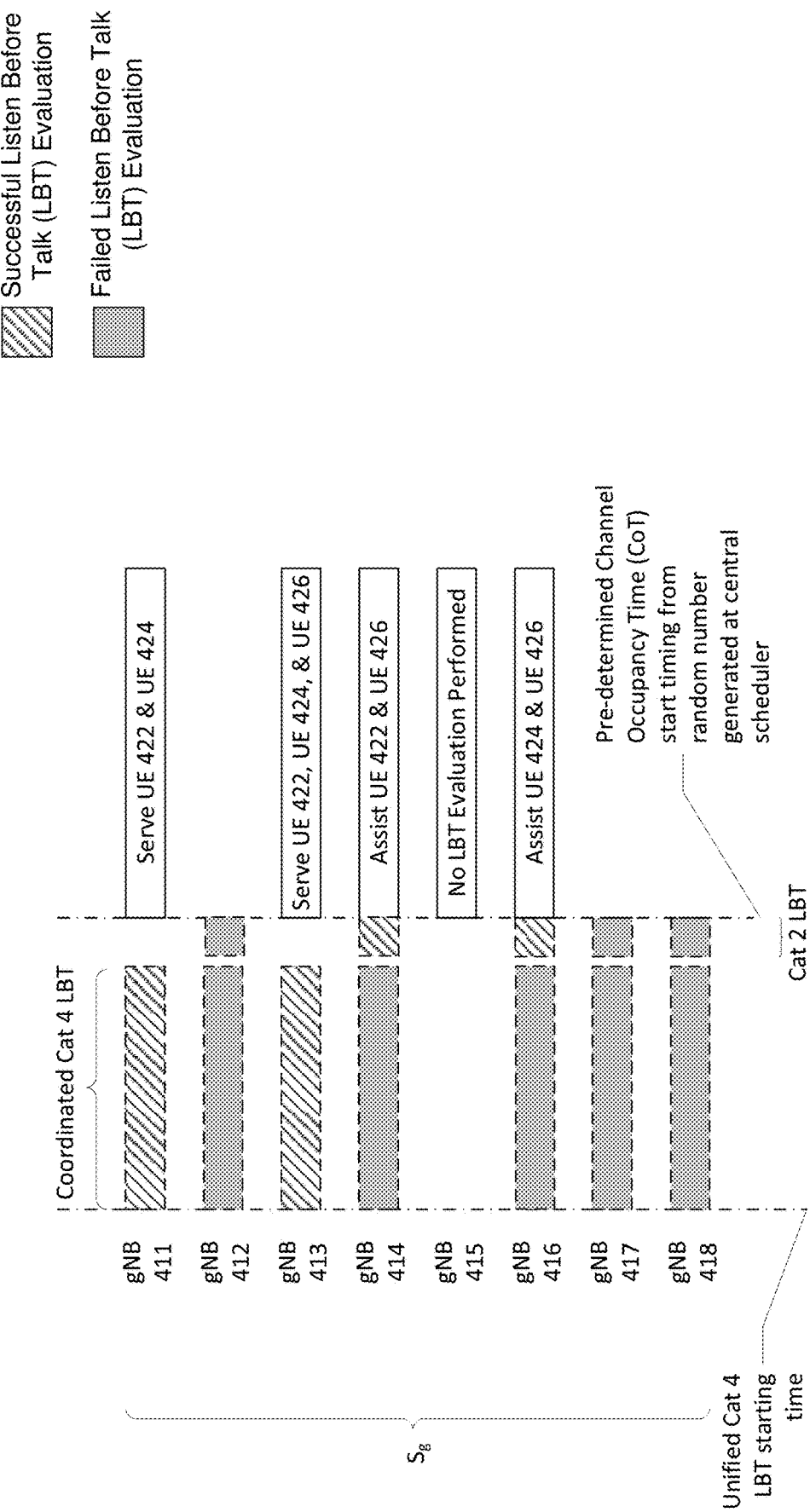
FIG. 7 illustrates a second set of exemplary LBT evaluations performed within the context of the particular configuration illustrated in FIG. 5 in accordance with aspects disclosed herein.

Referring next to FIG. 7 a second set of exemplary LBT evaluations performed within the context of the configuration illustrated in FIG. 6 is provided in accordance with the second CoMP design disclosed herein. In this example, it is assumed that the active set associations between the UEs 422, 424, 426, and 428 and the gNBs 411, 412, 413, 414, 415, 416, 417, and 418 are as follows:

| UE | Active Set |
|---|---|
| UE 422 | gNBs 411, 412, 413, and 414 |
| UE 424 | gNBs 411, 412, 413, and 416 |
| UE 426 | gNBs 413, 414, 416, and 418 |
| UE 428 | gNBs 414, 417, and 418 |

In this example, the centralized controller 400 may be configured to begin by identifying the union of all active set gNBs (i.e., gNBs 411, 412, 413, 414, 416, 417, and 418), and instructing each of these gNBs perform a Cat 4 LBT. The centralized controller 400 then identifies a subset of these active set gNBs based on whether they passed the Cat 4 LBT. As illustrated, for this example, it is assumed that gNB 411 and gNB 413 passed the Cat 4 LBT, whereas gNBs 412, 414, 416, 417, and 418 failed the Cat 4 LBT. As shown, since it is contemplated that only UEs with an active set gNB that passes a Cat 4 LBT can be served, only UE 422, UE 424, and UE 426 can thus be served, wherein UE 422 is served by gNB 411 and gNB 413; UE 424 is served by gNB 411 and gNB 413; and UE 426 is served by gNB 413.

As previously stated, the centralized controller 400 may also be configured to instruct any active set gNB that fails the Cat 4 LBT to nevertheless perform a Cat 2 LBT. Accordingly, in this example, each of gNB 412, gNB 414, gNB 416, gNB 417, and gNB 418 are instructed to perform a Cat 2 LBT, wherein gNB 412, gNB 417, and gNB 418 are shown as failing the Cat 2 LBT, and wherein gNB 414 and gNB 416 are shown as passing the Cat 2 LBT.

Figure 8:
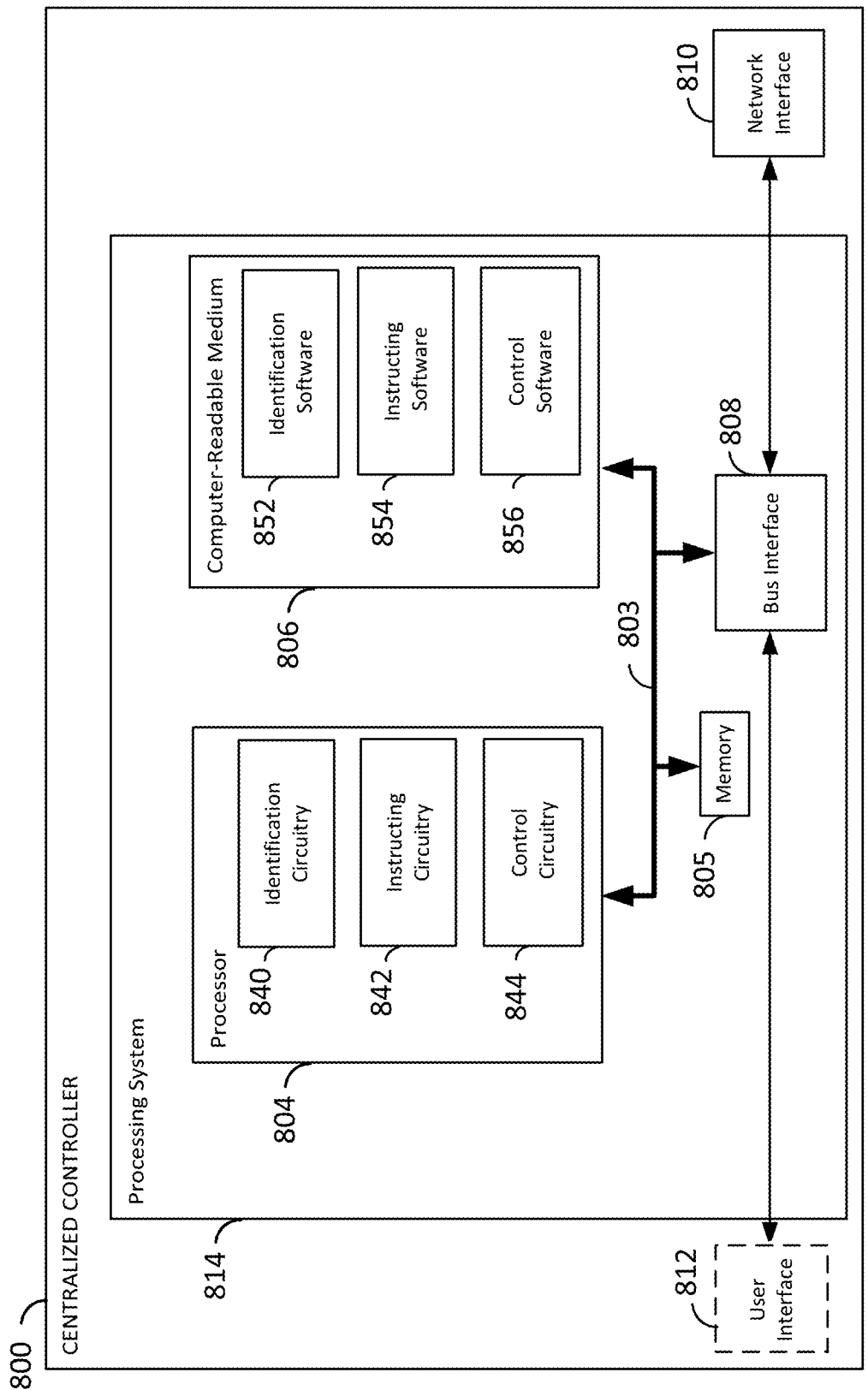
FIG. 8 is a block diagram illustrating an example of a hardware implementation for a scheduling entity employing a processing system in accordance with aspects disclosed herein.

In order to determine which gNBs can assist to serve a UE, the centralized controller 400 may then compare the UEs that were identified as being served (i.e., UE 422, UE 424, and UE 426) with corresponding active set gNBs of those UEs that passed the Cat 2 LBT. With respect to UE 422, the centralized controller 400 would thus identify gNB 414 as assisting UE 422, as shown. With respect to UE 424, the centralized controller 400 would then identify gNB 416 as assisting UE 424, and with respect to UE 426, the centralized controller 400 would identify each of gNBs 414 and 416 as assisting UE 426, as shown FIG. 8 is a block diagram illustrating an example of a hardware implementation for a centralized controller 800 employing a processing system 814. For example, the centralized controller 800 may be a UE as illustrated in any one or more of the FIGs. disclosed herein. In another example, the centralized controller 800 may be a base station (e.g., a gNB operating as a controller substantially similar to centralized controller 400) as also illustrated in any one or more of the figures disclosed herein.

The centralized controller 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the centralized controller 800 may be configured to perform any one or more of the functions described herein. That is, the processor 804, as utilized in a centralized controller 800, may be used to implement any one or more of the processes and procedures described below and illustrated in FIG. 9 and/or FIG. 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a network interface 810 (e.g., Ethernet, wireless, etc.). The network interface 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include an identification circuitry 840 configured for various functions, including, for example, to identify, for each of a plurality of scheduled entities, a corresponding set of scheduling entities. As illustrated, the processor 804 may also include an instructing circuitry 842 configured for various functions. For instance, the instructing circuitry 842 may be configured to instruct each scheduling entity to perform at least one LBT evaluation. The processor 804 may further include control circuitry 844 configured for various functions, including, for example, to control whether any of the plurality of scheduled entities is served by a corresponding one or more scheduling entities based on the at least one LBT evaluation performed by each scheduling entity. It should also be appreciated that, the combination of the identification circuitry 840, the instructing circuitry 842, and the control circuitry 844 may be configured to implement one or more of the functions described herein.

Various other aspects for centralized controller 800 are also contemplated. For instance, some aspects are directed towards implementing the aforementioned non-CoMP design, and similarly, the aforementioned first CoMP design. In a particular implementation of these designs, it is contemplated that, for each of the plurality of scheduled entities, the identification circuitry 840 may be configured to categorize each scheduling entity of the corresponding set of scheduling entities as belonging to at least one of a first type of scheduling entity subset (e.g., active set) or a second type of scheduling entity subset (e.g., candidate set). The instructing circuitry 842 may then be further configured to instruct a union of all scheduling entities categorized as belonging to the first type of scheduling entity subset to perform a first type of LBT evaluation (e.g., a Cat 4 LBT that utilizes a contention window based random backoff), and the control circuitry 844 may be configured to determine whether a scheduling entity is eligible to serve the scheduled entity based on an outcome of the first type of LBT evaluation performed by each corresponding scheduling entity categorized as belonging to the first type of scheduling entity subset.

Aspects for then performing a second type of LBT evaluation (e.g., a Cat 2 LBT that utilizes a fixed duration LBT measurement) are also contemplated. For instance, the instructing circuitry 842 may be further configured to instruct a union of all scheduling entities categorized as belonging to the second type of scheduling entity subset to perform this second type of LBT evaluation, and the control circuitry 844 may be configured to determine whether a scheduling entity is eligible to assist the scheduled entity based on an outcome of the second type of LBT evaluation performed by each corresponding scheduling entity categorized as belonging to the second type of scheduling entity subset. Alternatively, the instructing circuitry 842 may be configured to instruct scheduling entities that fail the first type of LBT evaluation to perform the second type of LBT evaluation, and the control circuitry 844 may be configured to determine whether a scheduling entity is eligible to assist the scheduled entity based on an outcome of the second type of LBT evaluation performed by each corresponding scheduling entity of the scheduled entity that failed the first type of LBT evaluation. In another aspect of the disclosure, it is contemplated that the control circuitry 844 may be configured to determine whether a scheduling entity in the candidate set of a corresponding scheduled entity is eligible to assist the corresponding scheduled entity based on whether the corresponding scheduled entity is served by a scheduling entity in the active set of the corresponding scheduled entity.

Aspects directed towards implementing the aforementioned second CoMP design are also disclosed. In a particular implementation of this design, it is contemplated that, for each of the plurality of scheduled entities, the identification circuitry 840 may be configured to categorize each scheduling entity of the corresponding set of scheduling entities as belonging to a first type of scheduling entity subset (e.g., an active set) associated with the corresponding scheduled entity. The instructing circuitry 842 may then be configured to instruct a union of all scheduling entities categorized as belonging to the first type of scheduling entity subset to perform a first type of LBT evaluation (e.g., a Cat 4 LBT that utilizes a contention window based random backoff), and the control circuitry 844 may be configured to determine whether a scheduling entity is eligible to serve the scheduled entity based on an outcome of the first type of LBT evaluation performed by each corresponding scheduling entity of the scheduled entity categorized as belonging to the first type of scheduling entity subset. The instructing circuitry 842 may also then be further configured to instruct scheduling entities that fail the first type of LBT evaluation to perform a second type of LBT evaluation (e.g., a Cat 2 LBT that utilizes a fixed duration LBT measurement), and the control circuitry 844 may be configured to determine whether a scheduling entity is eligible to assist the scheduled entity based on an outcome of the second type of LBT evaluation performed by each corresponding scheduling entity of the scheduled entity that failed the first type of LBT evaluation.

Aspects for coordinating the LBT evaluations of different scheduling entities are also contemplated. For instance, the instructing circuitry 842 may be configured to coordinate a common LBT evaluation end time for at least two of the scheduling entities of the set of scheduling entities. In a particular example, scheduling entities may utilize counters, wherein the instructing circuitry 842 may be configured to instruct scheduling entities employing a random backoff based LBT procedure (i.e., Cat-4 LBT) that reach a counter of zero prior to a coordinated end time to continue to decrement the counter until the start point. If a scheduling entity detects interference when the counter is zero or negative the scheduling entity may either declare that the LBT failed or restart with a new random backoff. At the coordinated end time, all scheduling entities with their counters at zero or negative counters are allowed to transmit.

Referring back to the remaining components of centralized controller 800, it should be appreciated that the processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include identification software 852 configured for various functions, including, for example, to identify, for each of a plurality of scheduled entities, a corresponding set of scheduling entities. As illustrated, the computer-readable storage medium 806 may also include instructing software 854 configured for various functions. For instance, the instructing software 854 may be configured to instruct each scheduling entity to perform at least one LBT evaluation. The computer-readable storage medium 806 may further include control software 856 configured for various functions, including, for example, to control whether any of the plurality of scheduled entities is served by a corresponding one or more scheduling entities based on the at least one LBT evaluation performed by each scheduling entity.

In a particular configuration, it is also contemplated that the centralized controller 800 includes means for identifying, for each of a plurality of scheduled entities, a corresponding set of scheduling entities; means for instructing each scheduling entity to perform at least one LBT evaluation; and means for controlling whether any of the plurality of scheduled entities is served by a corresponding one or more scheduling entities based on the at least one LBT evaluation performed by each scheduling entity. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 9:
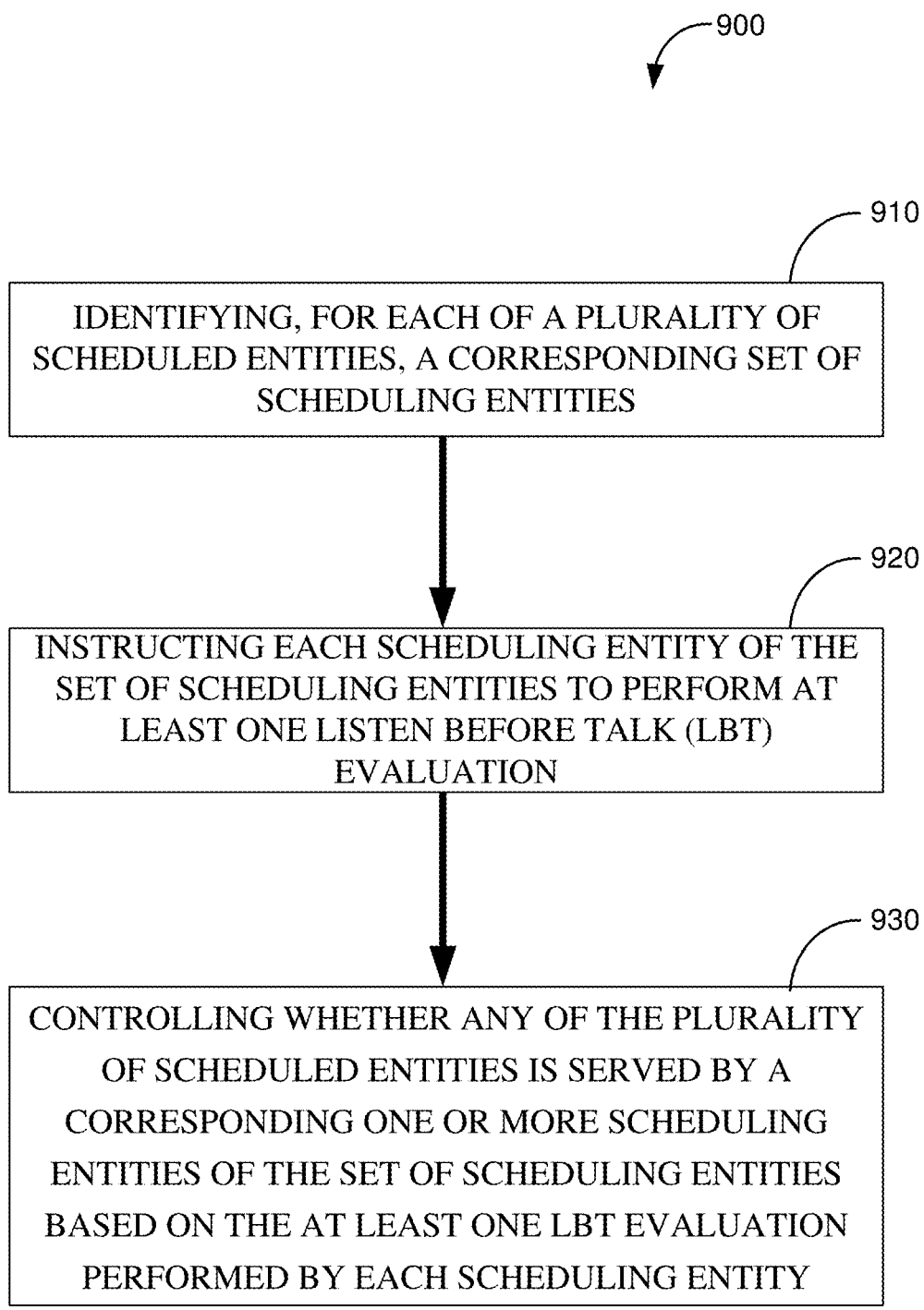
FIG. 9 is a flow chart illustrating an exemplary scheduling entity process that facilitates some aspects of the disclosure.
Figure 10:
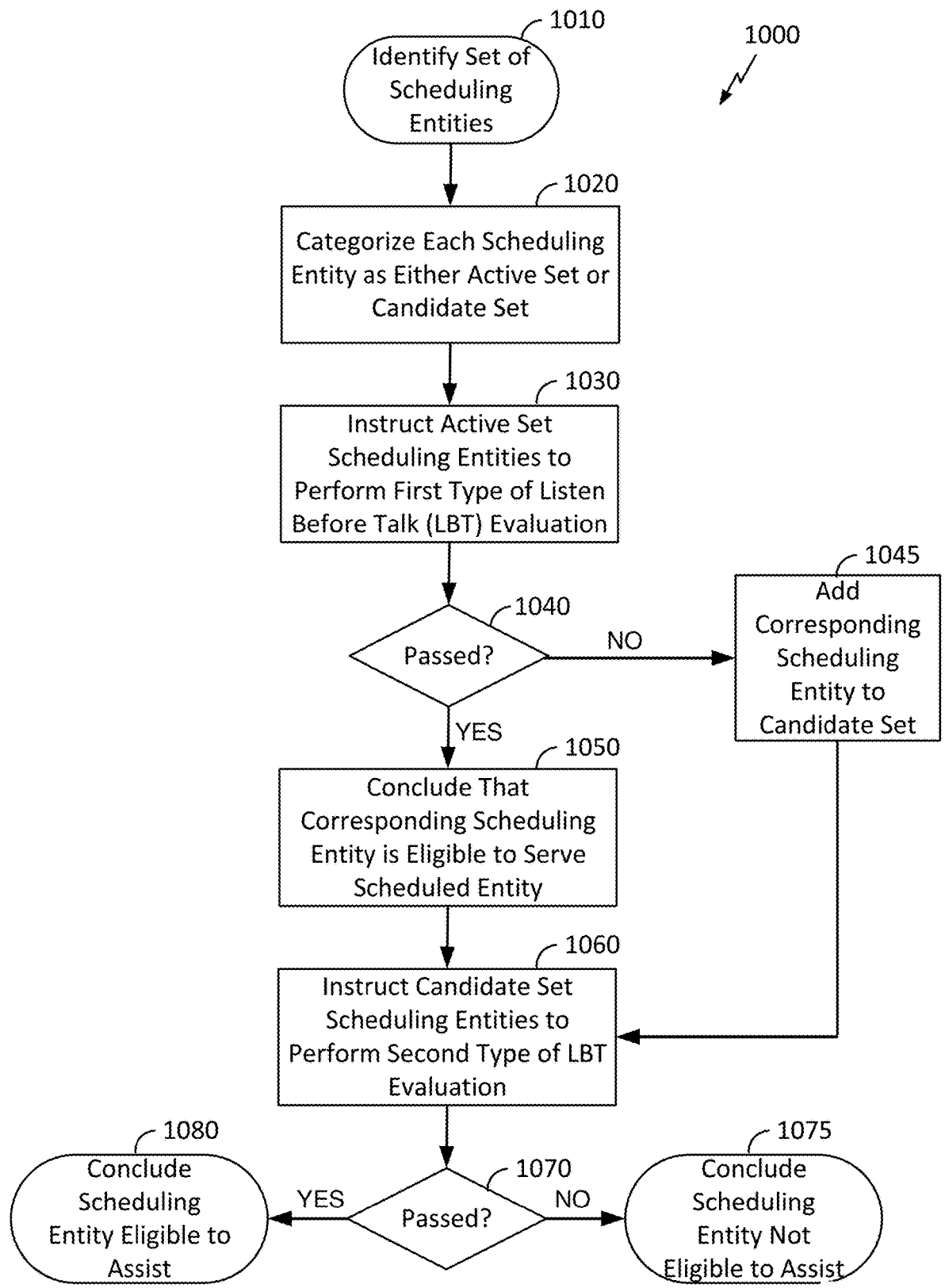
FIG. 10 is a flow chart illustrating an exemplary process that facilitates multi-node LBT functionality via a centralized controller in accordance with aspects disclosed herein.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein and utilizing, for example, the processes and/or algorithms described in relation to FIG. 9 and/or FIG. 10.

In FIG. 9, a flow chart is provided, which illustrates an exemplary centralized controller process that facilitates some aspects of the disclosure. As described below, some or all illustrated features may be omitted in a particular implementation within the scope of the present disclosure, and some illustrated features may not be required for implementation of all embodiments. In some examples, the process 900 may be carried out by a controller (e.g., the controller 400 illustrated in FIG. 4, the centralized controller 800 illustrated in FIG. 8, etc.). In some examples, the process 900 may be carried out by any suitable apparatus or means for carrying out the functions or algorithm described below.

Process 900 begins at block 910 with the centralized controller 800 identifying, for each of a plurality of scheduled entities, a corresponding set of scheduling entities. Process 900 then proceeds to block 920 where the centralized controller 800 instructs each scheduling entity of the set of scheduling entities to perform at least one LBT evaluation. Process 900 then concludes at block 930 where the centralized controller 800 controls whether any of the plurality of scheduled entities is served by a corresponding one or more scheduling entities of the set of scheduling entities based on the at least one LBT evaluation performed by each scheduling entity.

Referring next to FIG. 10, a flow chart is provided illustrating an exemplary process that facilitates multi-node LBT functionality via a centralized controller in accordance with aspects disclosed herein. As described below, some or all illustrated features may be omitted in a particular implementation within the scope of the present disclosure, and some illustrated features may not be required for implementation of all embodiments. In some examples, the process 1000 may be carried out by a controller (e.g., the controller 400 illustrated in FIG. 4, the centralized controller 800 illustrated in FIG. 8, etc.). In some examples, the process 1000 may be carried out by any suitable apparatus or means for carrying out the functions or algorithm described below.

Process 1000 begins at block 1010 with the controller identifying a set of scheduling entities associated with a scheduled entity. At block 1020, the controller then categorizes each scheduling entity as either a part of the scheduled entity's active set or candidate set. Process 1000 then proceeds to block 1030 where the controller instructs the scheduling entities categorized as "active set" scheduling entities to perform a first type of LBT evaluation (e.g., a Cat 4 LBT that utilizes a contention window based random backoff).

At block 1040, the controller determines whether the active set scheduling entities passed the first type of LBT evaluation. If a scheduling entity passes the LBT evaluation, process 1000 proceeds to block 1050 where the controller concludes that the scheduling entity is eligible to serve the scheduled entity, and subsequently proceeds to block 1060 where scheduling entities categorized as "candidate set" scheduling entities are instructed to perform a second type of LBT evaluation (e.g., a Cat 2 LBT that utilizes a fixed duration LBT measurement). Otherwise, if a scheduling entity does not pass the LBT evaluation at block 1040, the scheduling entity is added to the candidate set at block 1045, and the process 1000 then proceeds to block 1060 where the second type of LBT evaluation (e.g., a Cat 2 LBT that utilizes a fixed duration LBT measurement) is performed.

At block 1070, the controller determines whether the candidate set scheduling entities passed the second type of LBT evaluation. If a scheduling entity passes the LBT evaluation at block 1070, process 1000 concludes at block 1080 where the controller concludes that the scheduling entity is eligible to assist the scheduled entity. Otherwise, if the scheduling entity does not pass the LBT evaluation at block 1070, process 1000 concludes at block 1075 where the controller concludes that the scheduling entity is not eligible to assist the scheduled entity.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   identifying, for each of a plurality of scheduled entities, a corresponding set of scheduling entities;
   instructing each scheduling entity of the set of scheduling entities to perform at least one listen before talk (LBT) evaluation; and
   controlling whether any of the plurality of scheduled entities is served by a corresponding one or more scheduling entities of the set of scheduling entities based on the at least one LBT evaluation performed by each scheduling entity.

2. The method of claim 1, wherein the identifying comprises, for each of the plurality of scheduled entities, categorizing each scheduling entity of the corresponding set of scheduling entities as belonging to at least one of a first type of scheduling entity subset or a second type of scheduling entity subset.

3. The method of claim 2, wherein the first type of scheduling entity subset corresponds to an active set of a corresponding scheduled entity of the plurality of scheduled entities, and wherein the second type of scheduling entity subset corresponds to a candidate set of the corresponding scheduled entity of the plurality of scheduled entities.

4. The method of claim 3, wherein the controlling further comprises determining whether a candidate scheduling entity in the candidate set of the corresponding scheduled entity of the plurality of scheduled entities is eligible to assist the corresponding scheduled entity of the plurality of scheduled entities based on whether the corresponding scheduled entity of the plurality of scheduled entities is served by an active scheduling entity in the active set of the corresponding scheduled entity of the plurality of scheduled entities.

5. The method of claim 2, wherein the instructing further comprises instructing a union of all scheduling entities of the set of scheduling entities categorized as belonging to the first type of scheduling entity subset to perform a first type of LBT evaluation, and wherein the controlling comprises determining whether a scheduling entity of the set of scheduling entities is eligible to serve a scheduled entity of the plurality of scheduled entities based on an outcome of the first type of LBT evaluation performed by each corresponding scheduling entity of the set of scheduling entities categorized as belonging to the first type of scheduling entity subset.

6. The method of claim 5, wherein the instructing further comprises instructing a union of all scheduling entities of the set of scheduling entities categorized as belonging to the second type of scheduling entity subset to perform a second type of LBT evaluation, and wherein the controlling comprises determining whether the scheduling entity of the set of scheduling entities is eligible to assist the scheduled entity of the plurality of scheduled entities based on an outcome of the second type of LBT evaluation performed by each corresponding scheduling entity of the set of scheduling entities categorized as belonging to the second type of scheduling entity subset.

7. The method of claim 6, wherein the first type of LBT evaluation utilizes a contention window based random back-off, and wherein the second type of LBT evaluation utilizes a fixed duration LBT measurement.

8. The method of claim 1, wherein the identifying comprises, for each of the plurality of scheduled entities, categorizing each scheduling entity of the corresponding set of scheduling entities as belonging to a first type of scheduling entity subset associated with the corresponding scheduled entity of the plurality of scheduled entities.

9. The method of claim 8, wherein the instructing comprises instructing a union of all scheduling entities of the set of scheduling entities categorized as belonging to the first type of scheduling entity subset to perform a first type of LBT evaluation, and wherein the controlling comprises determining whether a scheduling entity of the set of scheduling entities is eligible to serve a scheduled entity of the plurality of scheduled entities based on an outcome of the first type of LBT evaluation performed by each corresponding scheduling entity of the set of scheduling entities categorized as belonging to the first type of scheduling entity subset.

10. The method of claim 1, wherein the instructing further comprises coordinating a common LBT evaluation end time for at least two of the scheduling entities of the set of scheduling entities.

11. A centralized controller in a wireless communication network comprising:
    a network interface communicatively coupled to a plurality of scheduling entities in the wireless communication network;
    a memory; and
    a processor communicatively coupled to the network interface and the memory, wherein the processor is configured to:
    identify, for each of a plurality of scheduled entities, a corresponding set of scheduling entities;
    instruct each scheduling entity of the set of scheduling entities to perform at least one listen before talk (LBT) evaluation; and
    control whether any of the plurality of scheduled entities is served by a corresponding one or more scheduling entities of the set of scheduling entities based on the at least one LBT evaluation performed by each scheduling entity.

12. The centralized controller of claim 11, wherein the processor, for each of the plurality of scheduled entities, is further configured to categorize each scheduling entity of the corresponding set of scheduling entities as belonging to at least one of a first type of scheduling entity subset or a second type of scheduling entity subset.

13. The centralized controller of claim 12, wherein the first type of scheduling entity subset corresponds to an active set of a corresponding scheduled entity of the plurality of scheduled entities, and wherein the second type of scheduling entity subset corresponds to a candidate set of the corresponding scheduled entity of the plurality of scheduled entities.

14. The centralized controller of claim 12, wherein the processor is configured to instruct a union of all scheduling entities of the set of scheduling entities categorized as belonging to the first type of scheduling entity subset to perform a first type of LBT evaluation, and wherein the processor is further configured to determine whether a scheduling entity of the set of scheduling entities is eligible to serve a scheduled entity of the plurality of scheduled entities based on an outcome of the first type of LBT evaluation performed by each corresponding scheduling entity of the set of scheduling entities categorized as belonging to the first type of scheduling entity subset.

15. The centralized controller of claim 14, wherein the processor is configured to instruct a union of all scheduling entities of the set of scheduling entities categorized as belonging to the second type of scheduling entity subset to perform a second type of LBT evaluation, and wherein the processor is further configured to determine whether the scheduling entity of the set of scheduling entities is eligible to assist the scheduled entity of the plurality of scheduled entities based on an outcome of the second type of LBT evaluation performed by each corresponding scheduling entity of the set of scheduling entities categorized as belonging to the second type of scheduling entity subset.

16. The centralized controller of claim 14, wherein the processor is configured to instruct scheduling entities of the set of scheduling entities that fail the first type of LBT evaluation to perform a second type of LBT evaluation, and wherein the processor is further configured to determine whether the scheduling entity of the set of scheduling entities is eligible to assist the scheduled entity of the plurality of scheduled entities based on an outcome of the second type of LBT evaluation performed by each corresponding scheduling entity of the set of scheduling entities that failed the first type of LBT evaluation.

17. The centralized controller of claim 11, wherein the processor, for each of the plurality of scheduled entities, is configured to categorize each scheduling entity of the corresponding set of scheduling entities as belonging to a first type of scheduling entity subset associated with the corresponding scheduled entity.

18. The centralized controller of claim 17, wherein the first type of scheduling entity subset is an active set of scheduling entities of the set of scheduling entities associated with the corresponding scheduled entity.

19. The centralized controller of claim 17, wherein the processor is configured to instruct a union of all scheduling entities of the set of scheduling entities categorized as belonging to the first type of scheduling entity subset to perform a first type of LBT evaluation, and wherein the processor is further configured to determine whether a scheduling entity of the set of scheduling entities is eligible to serve a scheduled entity of the plurality of scheduled entities based on an outcome of the first type of LBT evaluation performed by each corresponding scheduling entity of the set of scheduling entities categorized as belonging to the first type of scheduling entity subset.

20. The centralized controller of claim 19, wherein the processor is configured to instruct scheduling entities of the set of scheduling entities that fail the first type of LBT evaluation to perform a second type of LBT evaluation, and wherein the processor is further configured to determine whether the scheduling entity of the set of scheduling entities is eligible to assist the scheduled entity of the plurality of scheduled entities based on an outcome of the second type of LBT evaluation performed by each corresponding scheduling entity of the set of scheduling entities that failed the first type of LBT evaluation.

21. An apparatus in a wireless communication network, comprising:
    means for identifying, for each of a plurality of scheduled entities, a corresponding set of scheduling entities;
    means for instructing each scheduling entity of the set of scheduling entities to perform at least one listen before talk (LBT) evaluation; and
    means for controlling whether any of the plurality of scheduled entities is served by a corresponding one or more scheduling entities of the set of scheduling entities based on the at least one LBT evaluation performed by each scheduling entity.

22. The apparatus of claim 21, wherein the means for identifying, for each of the plurality of scheduled entities, is configured to categorize each scheduling entity of the corresponding set of scheduling entities as belonging to a first type of scheduling entity subset associated with a corresponding scheduled entity of the plurality of scheduled entities.

23. The apparatus of claim 22, wherein the first type of scheduling entity subset is an active set of scheduling entities of the set of scheduling entities associated with the corresponding scheduled entity of the plurality of scheduled entities.

24. The apparatus of claim 22, wherein the means for instructing is configured to instruct a union of all scheduling entities of the set of scheduling entities categorized as belonging to the first type of scheduling entity subset to perform a first type of LBT evaluation, and wherein the means for controlling is configured to determine whether a scheduling entity of the set of scheduling entities is eligible to serve a scheduled entity of the plurality of scheduled entities based on an outcome of the first type of LBT evaluation performed by each corresponding scheduling entity of the set of scheduling entities categorized as belonging to the first type of scheduling entity subset.

25. The apparatus of claim 24, wherein the means for instructing is configured to instruct scheduling entities of the set of scheduling entities that fail the first type of LBT evaluation to perform a second type of LBT evaluation, and wherein the means for controlling is configured to determine whether the scheduling entity of the set of scheduling entities is eligible to assist the scheduled entity of the plurality of scheduled entities based on an outcome of the second type of LBT evaluation performed by each corresponding scheduling entity of the set of scheduling entities that failed the first type of LBT evaluation.

26. An article of manufacture for use by a centralized controller in a wireless communication network, the article comprising:
    a non-transitory computer-readable storage medium having stored therein instructions executable by one or more processors of the centralized controller to:
        identify, for each of a plurality of scheduled entities, a corresponding set of scheduling entities;
        instruct each scheduling entity of the set of scheduling entities to perform at least one listen before talk (LBT) evaluation; and control whether any of the plurality of scheduled entities is served by a corresponding one or more scheduling entities of the set of scheduling entities based on the at least one LBT evaluation performed by each scheduling entity.

27. The article of manufacture of claim 26, wherein the instructions comprises instructions executable by the one or more processors of the centralized controller to, for each of the plurality of scheduled entities, categorize each scheduling entity of the corresponding set of scheduling entities as belonging to at least one of a first type of scheduling entity subset or a second type of scheduling entity subset.

28. The article of manufacture of claim 27, wherein the instructions comprises instructions executable by the one or more processors of the centralized controller to instruct a union of all scheduling entities of the set of scheduling entities categorized as belonging to the first type of scheduling entity subset to perform a first type of LBT evaluation, and wherein the instructions further comprises instructions executable by the one or more processors of the centralized controller to determine whether a scheduling entity of the set of scheduling entities is eligible to serve a scheduled entity of the plurality of scheduled entities based on an outcome of the first type of LBT evaluation performed by each corresponding scheduling entity of the set of scheduling entities categorized as belonging to the first type of scheduling entity subset.

29. The article of manufacture of claim 28, wherein the instructions comprises instructions executable by the one or more processors of the centralized controller to instruct a union of all scheduling entities of the set of scheduling entities categorized as belonging to the second type of scheduling entity subset to perform a second type of LBT evaluation, and wherein the instructions further comprises instructions executable by the one or more processors of the centralized controller to determine whether the scheduling entity of the set of scheduling entities is eligible to assist the scheduled entity of the plurality of scheduled entities based on an outcome of the second type of LBT evaluation performed by each corresponding scheduling entity of the set of scheduling entities categorized as belonging to the second type of scheduling entity subset.

30. The article of manufacture of claim 28, wherein the instructions comprises instructions executable by the one or more processors of the centralized controller to instruct scheduling entities of the set of scheduling entities that fail the first type of LBT evaluation to perform a second type of LBT evaluation, and wherein the instructions further comprises instructions executable by the one or more processors of the centralized controller to determine whether the scheduling entity of the set of scheduling entities is eligible to assist the scheduled entity of the plurality of scheduled entities based on an outcome of the second type of LBT evaluation performed by each corresponding scheduling entity of the set of scheduling entities that failed the first type of LBT evaluation.

* * * * *